INVENTOR:
John T. Mullin
By Smyth, Roston & Pavitt
Attorneys.

FREQUENCY MODULATED VIDEO FILM RECORDING

Original Filed Dec. 9, 1960 3 Sheets-Sheet 2

INVENTOR:
John T. Mullin
By Smyth, Roston & Pavitt
Attorneys.

Feb. 1, 1966 J. T. MULLIN 3,233,039

FREQUENCY MODULATED VIDEO FILM RECORDING

Original Filed Dec. 9, 1960 3 Sheets-Sheet 3

INVENTOR:
John T. Mullin

By Smyth, Roston & Pavitt
Attorneys.

United States Patent Office 3,233,039

Patented Feb. 1, 1966

3,233,039
FREQUENCY MODULATED VIDEO FILM RECORDING

John T. Mullin, Beverly Hills, Calif., assignor to Minnesota Mining and Manufacturing Company, St. Paul, Minn., a corporation of Delaware Original application Dec. 9, 1960, Ser. No. 75,464. Divided and this application Sept. 29, 1964, Ser. No. 403,433

10 Claims. (Cl. 178—6.7)

This invention relates to recording and reproducing systems and, more particularly, to such systems capable of recording and reproducing signals over a wide frequency range such as, for example, video signals.

This application is a division of Patent No. 3,137,768, formerly Serial No. 75,464, filed December 9, 1960 entitled "Transducing System."

Conventional apparatus for recording video information includes either magnetic tape equipment or photographic equipment. At first, photographic equipment was utilized even though it had many disadvantages because the tape equipment was limited at reasonable tape speeds with respect to its usable frequency range. The video image was recorded as successive frames in accordance with conventional motion film techniques. Magnetic tape recording equipment has, however, been developed for transversely recording and reproducing signals covering a relatively wide frequency range across a magnetic tape. This transverse recording equipment is in the main equipment currently utilized for recording video information.

One such transverse recording equipment utilizes a rotary magnetic head assembly provided with magnetic units arranged to sweep successively across a relatively wide magnetic tape. While such equipment is workable, it is subject to a number of important disadvantages. For example, while a fineness of detail can be recorded and reproduced in the direction of the rotation of the high speed magnetic heads, detail in the direction of motion of the tape is very poor. The detail is poor because of the finite width of the head structure and because the successive transverse tracks must be separated by a few thousandths of an inch to avoid crosstalk between tracks. Another disadvantage is that the high speed rotating heads must be very accurately controlled by high grade servo systems to maintain synchronization and low flutter. Further editing of the tape is difficult because the operator cannot view the picture by inspecting the surface of the tape. Still another important disadvantage is that the sound accompanying the video image is linearly displaced from the recorded video information and not synchronized with the transverse tracks. This latter disadvantage further complicates the procedure of editing.

In a specific illustrative embodiment of this invention, these disadvantages are overcome utilizing a transverse recording and reproducing system capable of handling high grade picture information accompanied by high fidelity sound. In the specific illustrative embodiment, high speed mechanical devices are not utilized and instead high speed electronic devices are provided, such as cathode ray tubes and flying spot scanners. The recording apparatus may include two cathode ray tubes: a cathode ray tube for recording the video signals, and a cathode ray tube for recording the audio signals. The two cathode ray tubes are both associated with a strip of continuously moving film which may function as the recording medium.

The video signals to be recorded may be of the type conventional in the United States comprising a succession of horizontal line scans. The video signals are frequency modulated on a carrier and the modulated carrier is first rectangularized and then introduced to the cathode ray tube for recording. Vertical deflection is not required because of the continuous movement of the film strip adjacent the two cathode ray tubes. Gamma and gray scale problems usually associated with film are non-existent because there are only two states of the cathode ray tube current, on and off. Only two states of current are provided because the modulated carrier is rectangularized before it is introduced to the video cathode ray tube. A typical recorded line of the video information, on examination under a microscope, consists of a series of alternate dark and light dashes, the duration of which changes with the video information.

Features of this invention pertain to means for providing visible images at the film which is readily viewable by an observer. The images are substantially the same as the successive images represented by the input video signals. The frequency modulation of the video signals is such that the lighter portions of the images represented by the video signals provide for lower frequencies and the darker portions for higher frequencies. The successive lines on the film are recorded quite close together and the observer can view and edit the recorded picture quite readily by providing light at an angle to the grating formed by the alternate dark and light dashes of the lines. The resultant interference pattern provides for an image where the closely spaced dots in each line blend together. Since these spots represent the dark portions of the original image represented by the video signals, a picture of substantially the same as the original image is provided to the observer.

Further features of this invention relate to the provision of means for recording the sound information accompanying the video information in direct line by line synchronization with the transverse lines recorded across the moving film. The audio cathode ray tube, mentioned above, is utilized for transversely recording the sound, and is driven in synchronization with the cathode ray tube for the video signals. Means are provided for sampling the audio signals and for converting the audio signals to pulse duration signals. The pulse duration signals are transversely recorded across part of the film strip and the video modulated carrier is recorded across another part of the film strip. Effectively, a recorded line extending across the film strip includes two parts: a first part for the sound information which is recorded by the audio cathode ray tube, and a second part for the video information which is recorded by the video cathode ray tube. The duration of the pulses derived from the sound information determines the length of a recorded line in the first part for each of the transverse lines across the film strip. The successive lines for the sound information on the film strip would appear upon a casual inspection to form a variable area sound track.

The maximum frequency of the sound recordable in this manner is limited by the repetition rate of the transverse lines across the film strip utilized to record the successive pulse duration signals. The sampling rate of the audio signals, however, may be increased by a predetermined ratio and a number of successive sound lines or group of such lines may be recorded across the audio part of the film strip for each video line across the video part of the film strip. The first of each group of sound lines may be initiated simultaneously with the video line so as to be directly in line with the video line. High fidelity sound information may, accordingly be recorded which is in direct synchronization, line by line, with the video transverse line recording.

A pair of flying spot scanners may be utilized for reproducing the video and sound information recorded on a film strip. Separate photocell means are positioned relative to the film strip for receiving respectively the video and the audio or sound information illuminated by the pair of flying spot scanners. Thus, line by line, the video signals are reproduced at the video photocell means as one spot sweeps across the film, and at the same time the sound, in the form of variable pulse signals, is developed at the audio photocell means as the other spot sweeps across the film. Means are provided for converting the pulse duration pulses to amplitude modulation pulses and for integrating the amplitude modulated pulses to provide a varying signal which is the same as the original audio signal provided for recording.

Further features of this invention pertain to the provision of noise reduction means for avoiding noise due to the presence of dirt on the film strip. Means are provided for controlling the flying spot scanner for the audio signals to initiate each trace or line scan at an opaque portion on the film strip. Each pulse on the film strip may be opaque or dark, and the trace starts just after the beginning of the recorded pulse. A pulse is developed by the associated photocell means at a time position when the scanning spot reaches the transparent portion of the film following the recorded pulse. Dirt either on the opaque recorded pulse or on the transparent portion following the pulse does not affect the accuracy of the reproduction or introduce any noise.

Further advantages and features of this invention will become apparent upon consideration of the following description when read in conjunction with drawing wherein.

Figure 1:
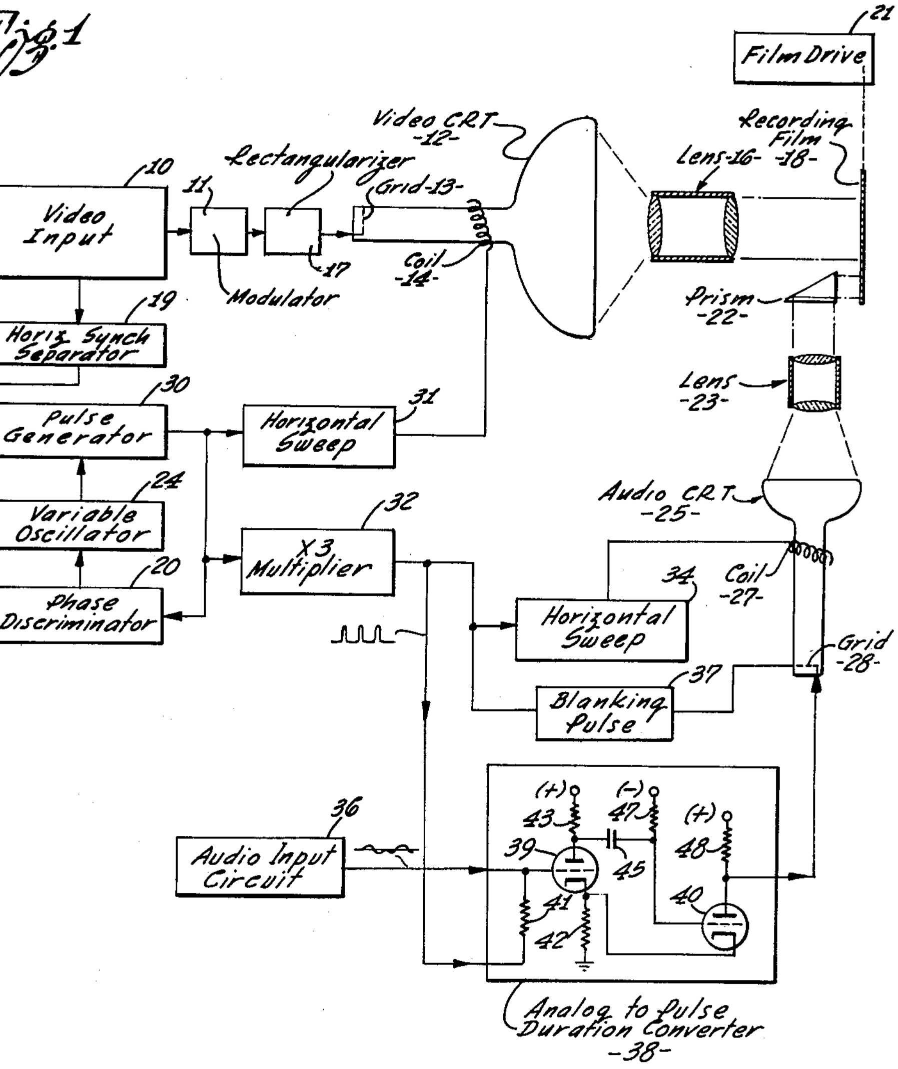
FIGURE 1 is a functional representation of the recording apparatus of the recording and reproducing system of this invention.

Referring first to FIGURE 1, which shows the reproducing apparatus of this invention, the signals to be recorded may be conventional video signals provided by a video input circuit 10, and high fidelity audio signals accompanying the video signals which are provided from an audio input cricuit 36. The conventional television signal in the United States includes 525 horizontal lines at a repetition rate of 15,750 lines per second for each frame. The repetition rate of the frames is 30 frames per second, with each frame representing a separate image or scene. The video signals may also include horizontal and vertical synchronization and blanking pulses.

The video signals are introduced from the circuit 10 to a frequency modulator 11 for frequency modulating a carrier. The carrier may have a frequency of approximately 5 megacycles which is suitable for modulation by the wide band television signals. The modulation is such that the video signals representing lighter portions of the images or scenes provide for lower frequencies, and the darker portions provide for higher frequencies. As is hereinafter described, this direction of modulation is an important feature in the apparatus for viewing and editing the recorded frames. The frequency modulated signal from the modulator 11 is introduced to a circuit 17 which rectangularizes the individual pulses of the frequency modulated carrier. Illustratively, the circuit 17 may be a Schmidt trigger circuit which operates in one direction when the carrier increases to a predetermined value and which operates in the other direction when the carrier decreases to a predetermined value. The circuit 17 may also be an over-driven amplifier which rectangularizes the frequency modulated signal. The output of the circuit 17, accordingly, is a series of rectangular or flat top pulses having a duration which varies in accordance with the video signals from the input circuit 10.

The rectangularized frequency modulated carried from the circuit 17 is introduced to the grid 13 of a video cathode ray tube 12. The cathode ray tube 12 is one of two cathode ray tubes 12 and 25 utilized in the recording apparatus of this invention. The tube 12 is utilized to record the video signals and the tube 25 is used to record the high fidelity audio signals from the circuit 36. The signal to the grid 13 of the cathode ray tube consists of a series of pulses of varying lengths depending upon the frequency modulation of the video information. The beam in the cathode ray tube 12 is, therefore turned on and off in accordance with the successive pulses from the circuit 17.

The horizontal movement of the beam in the cathode ray tube 12 is synchronized with the video signals provided from the input circuit 10 so that a horizontal line of the cathode ray tube 12 is initiated at the beginning of a horizontal line of the video signals. A conventional type horizontal sync pulse separator 19 may be utilized to separate the horizontal synchronizing pulses of the video input signals from the circuit 10. The horizontal synchronizing pulses are provided from the separator 19 to a phase discriminator 20 which compares the phase of these pulses with the phase of pulses provided from a pulse generator 30. Any difference in phase between the two sets of pulses provides for an error signal at the output of the phase discriminator 20 which is introduced to a variable oscillator 24. The oscillator 24 may include a reactance tube, not shown, or other means for varying the frequency of the oscillator in accordance with the error signal from the phase discriminator. The frequency of the oscillator 24, accordingly, varies in accordance with the error signal provided thereto so as to be directly in step with the horizontal synchronizing pulses of the video signals. The signal from the oscillator 24 is provided to the pulse generator 30 so that the pulse generator 30 is driven in step and in phase with the horizontal synchronizing pulses of the video input signal.

The pulses from the pulse generator 30 are provided to a horizontal sweep circuit 31 which controls the deflection of the beam across the face of the tube 12. Vertical deflection is unnecessary because the image on the face of the cathode ray tube 12 is provided through a lens system 16 to a moving strip of recording film 18. The film 18 may be driven by a conventional film drive 21 to move at a relatively constant velocity so that line after line of the video signals are recorded on the film due to its own motion. The speed of the film 18 determines the spacing between the successive horizontal video lines. The lines are recorded transversely across the film strip in a direction substantially perpendicular to its direction of motion.

The present invention is not restricted to photographic recording techniques as for example thermoplastic recording techniques may be utilized for recording the video and audio signals. When thermoplastic recording is provided, an electron beam in a flying spot scanner is used instead of a cathode ray tube as the transducing or recording means. The specific photograph illustrative embodiment is accordingly merely illustrative.

At the same time that the video information is being recorded line by line transversely across the film strip 18, the audio input information from the circuit 36 is also recorded on the film strip 18. The input audio signal from the circuit 36 is provided to an analog-to-pulse duration converter 38. The converter 38 successively samples the audio signal and provides a succession of pulses varying in duration in accordance with the instantaneous magnitudes of the audio signal. The sampling input rate of the audio signals may be a multiple of the repetition rate of the tranverse lines across the film 18. The horizontal line repetition rate of the conventional video signal is 15,750 lines per second. Utilizing a sampling rate system of the type described herein, frequencies equal to approximately one third the sampling rate may be recorded. If the sampling rate, accordingly, is 15,750 cycles per second, the upper recordable frequency of the sound is approximately 5,250 cycles per second. For high fidelity recording, frequencies above these frequencies are, however, required. The sampling rate of the converter 38 is, accordingly, higher than the line repetition rate of the video signals. Illustratively, the sampling rate may be three times the video line repetition rate to provide for recording sound frequencies up to about 15 kc.

The pulse generator 30, described above, provides the pulses at a repetition rate of 15,750 pulses per second to a frequency multiplier 32 as well as to the sweep circuit 31. The output of the multiplier 32 may be a series of pulses at a repetition rate of three times 15,750 pulses per second which is 47,250 pulses per second. These pulses from the multiplier 32 are synchronized with the input video signal because the pulse generator 30 is synchronized therewith. The pulses from the multiplier 32 are utilized to operate a horizontal sweep circuit 34 and a blanking pulse generator 37 associated with the audio cathode ray tube 25. The pulses from the multiplier 32 are also introduced to the converter 38 for successively sampling the audio input signals. The audio input signals are, accordingly, sampled at a rate of 47,250 times per second and the audio cathode ray tube 25 is operated at a line scanning rate of 47,250 lines per second.

Any conventional type of analog-to-pulse duration converter may be utilized for converting the analog audio signals to pulse duration signals. One such converter is depicted in detail in FIGURE 1. The sampling pulses are provided through a resistor 41 to the control grid of a triode 39 in the converter 38. A varying bias potential is provided to the control grid of the tube 39 from the audio input circuit 36, but the magnitude of the successive pulses from the multiplier 32 is constant. The signal at the control grid, accordingly, represents the sum of the magnitude of the sampling pulse and the instantaneous magnitude of the audio input signal. The signal at the control grid of the triode 39 varies the conductivity of the triode and accordingly the potential at its anode. The tube 39 is conductive over a path from a positive potential source through a plate resistor 43, the triode 39 and a cathode resistor 42 to ground. Between pulses from the multiplier 32, the potential at the anode of the tube 39 is determined by the instantaneous magnitude of the audio input signal. The potential at the anode controls the discharge time of a capacitor 45 connected between the anode of the triode 39 and the control grid of a triode 40 so that the triode 40 becomes conductive at a time determined by the instantaneous magnitude of the audio input signal. The control grid of the triode 40 is biased from a negative potential source through a resistor 47 so that the triode 40 remains non-conductive when only the audio signals are introduced to the control grid of the triode 34. The cathode of the triode 40 is connected to the cathode resistor 42, and its anode is biased through a resistor 48 connected to a positive potential source. Responsive to each pulse from the multiplier 32, a pulse is developed by the converter 38 initiating at a time determined by the magnitude of the audio input signal. The negative pulse from the converter 38 may be utiized for blanking the beam in the cathode ray tube 25.

Figure 3:
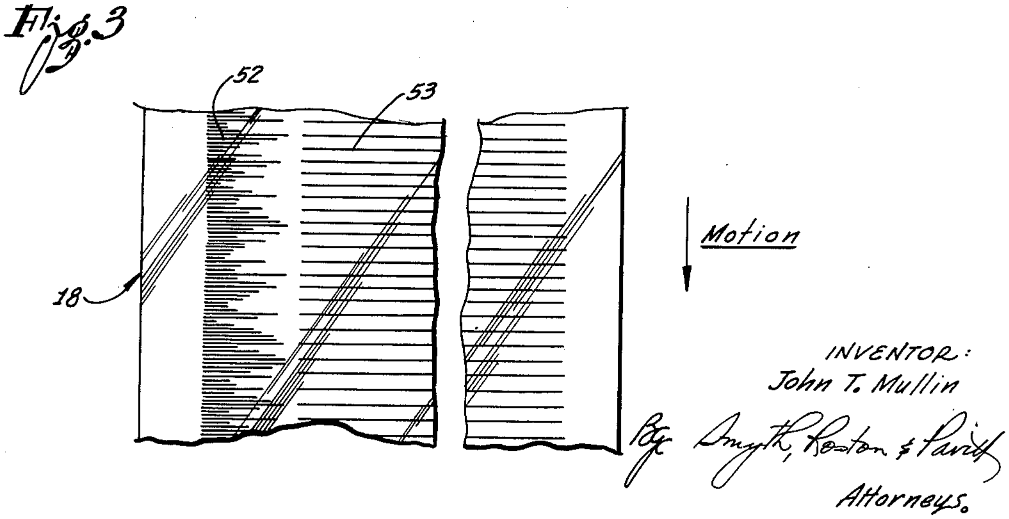
FIGURE 3 is a fragmentary view of the film strip utilized in the recording and reproducing system of this invention illustrating the disposition and synchronization of the recorded sound and video signals.

Referring now to FIGURE 3, the successive audio lines 52 on the film strip 18 are each initiated and then are terminated by the converter 38 at a point determined by the audio signals. The film strip 18 may be capstan or sprocket driven at a constant speed adjacent the tubes 12 and 25. The film strip 18 includes the audio recorded lines 52 and the video recorded lines 53 shown arranged along two longitudinal or lengthwise areas of the strip 18. Three audio recorded lines 52 are provided for each of the video recorded lines 53. The first of each three audio lines 52 may be directly in alignment with the associated video line 53. Depending upon the polarity of the pulses introduced to the tube 25, and whether a positive or negative is made from the film strip, one portion or the other of the transverse line across the audio portion of the strip 18 may be dark and the other light. The video portion and each line 53 consists of many dark and light dashes of varying lengths depending upon the video information.

Figure 4:
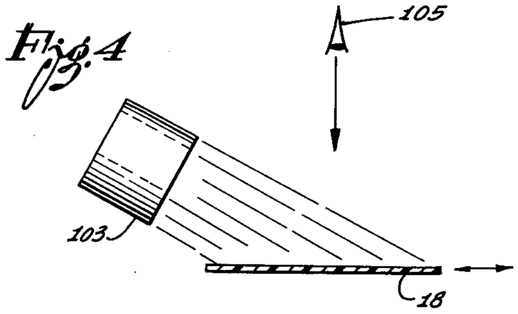
FIGURE 4 is a diagramattic representation of apparatus for viewing the successively recorded images on the film strip.
Figure 5:
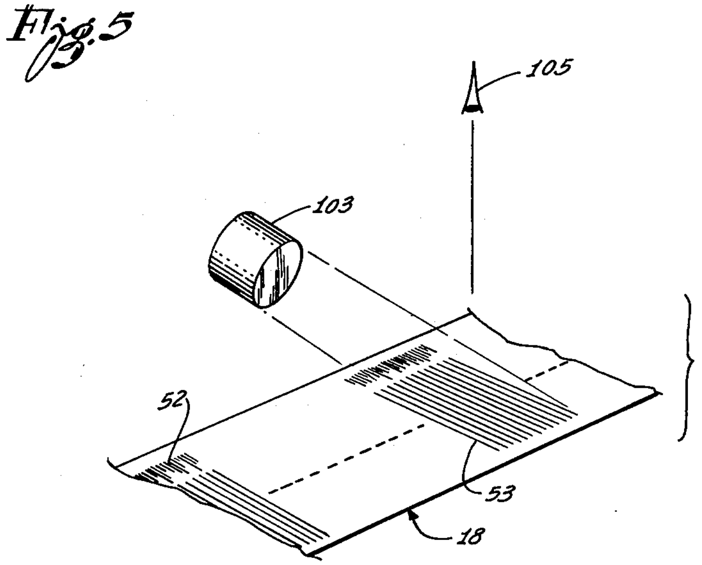
FIGURE 5 is a pictorial view of the apparatus for viewing the successively recorded images on the film strip.

In FIGURE 3, the longitudinal spacing of the lines 52 and 53 is exaggerated as they would be much closer together and seeming to blend one into another to an observer. For example, if the width of each track or line 53 is .75 inch, the 262.5 lines forming a video field may occupy $3/4 \times .75 = 9/16$ inch or have a density of approximately 466 lines per inch. The lines 53, accordingly, form a diffraction grating of light and dark dashes of varying lengths. The appearance of the frame is gray. However, when light is provided at an angle to the film strip 18, as depicted in FIGURES 4 and 5, the closely spaced successive dots in each line 53 seem to blend together due to the interference patterns formed by the grating. As described above, the closely spaced dots represent darker portions of the scene represented by the input video signals. In FIGURES 4 and 5, light is provided from a source 103, and the lines 53 are aligned in the direction of the arrow at the right of the strip 18 in FIGURE 4. When viewed in this manner, interference patterns result in effectively blending the closely spaced dots in each line 53 as a contiguous dark mass. In this manner, the portions of each line 53 representing darker portions actually appears darker so that the resulting image to an observer at position 105 is essentially the same as the original scene from which the input video signals were produced. This image may be projected and enlarged for easier viewing.

Figure 2:
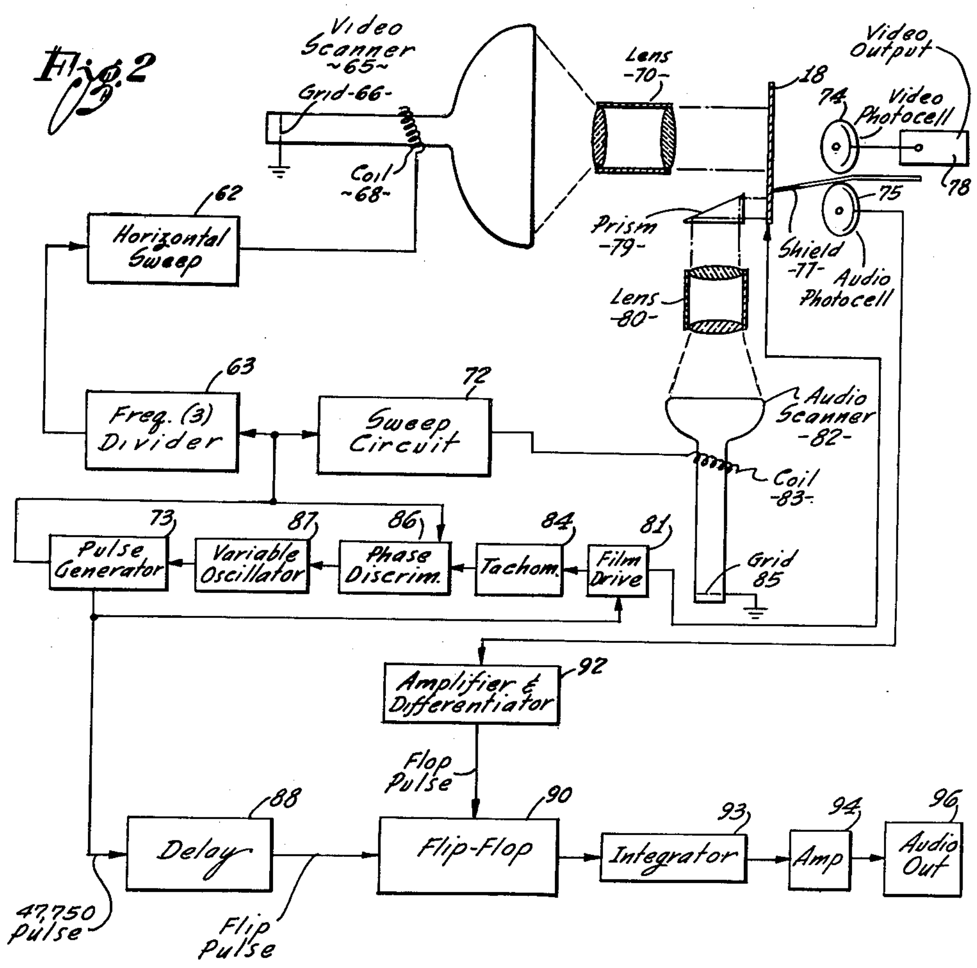
FIGURE 2 is a functional representation of the reproducing apparatus of the recording and reproducing system of this invention.

The successive frames of the video signals are recorded on the film strip 18, field by field, with a separation between the recorded video signals due to the vertical blanking interval in the signals between successive fields. The video and audio information may be reproduced from the film strip 18 by the apparatus depicted in FIGURE 2. As shown in FIGURE 2, two flying spot scanners 65 and 82 are utilized for reproducing respectively the video and the audio signals from the strip 18. The flying spot scanner 65 and the flying spot scanner 82 are both synchronized with the movement of the film strip 18. The motor or film drive 81 drives a tachometer 84 which may include multiplying means, not shown. The output of the tachometer 84 is a series of pulses having a repetition rate or frequency which varies with the speed of the motor 81. The nominal repetition rate may be 47,250 cycles per second.

The successive pulses from the tachometer 84 are introduced as one input to a phase discriminator 86. The other input is provided from the pulse generator 73 having a nominal repetition rate of 47,750 pulses per second. The difference in phase between the pulses from the generator 73 and between the differentiated pulses from the tachometer 84 causes the discriminator 86 to develop an error signal in accordance therewith. The error signal from the discriminator 86 is introduced to a variable oscillator 87 which controls the instantaneous repetition rate of the pulse generator 73. The pulse generator 73 is, in this manner, synchronized with the movement of the film strip 18.

The pulses from the pulse generator 73 are introduced to a sweep circuit 72 for controlling the horizontal line frequency of the audio scanner 82. The sweep signals from the circuit 72 are provided to a deflection coil 83 of the audio scanner 82. The control grid 85 of the scanner 82 may be grounded. The pulses from the generator 73 are also introduced to a frequency divider 63 which provides pulses at a nominal repetition rate of 15,750 pulses per second. The frequency division is, accordingly, by a factor of 3. The pulses from the frequency divider 63 are introduced to a horizontal sweep circuit 62 for controlling the deflection of the video scanner 65. Sweep signals from the circuit 62 are provided to a deflection coil 68 of the video scanner 65. The control grid 66 of the video scanner 65 may be grounded. The two scanners 65 and 82 are, in this manner, operated in synchronism with the signals recorded on the film strip 18, with the scanner 82 being operated at a line scanning rate three times that of the scanner 65. The beams in the scanner 65 are blanked during the retrace time so that signals are not developed at the photocells 74 and 75 at such times. The signals from the film strip 18 are simultaneously received at the photocells 74 and 75 from the two different longitudinal areas of the film strip 18. More particularly, the signals from the video lines 53 are received at the photocell 74, and the signals from the audio lines 52 are received at the audio photocells 75. The two photocells 74 and 75 may be separated by a light shield 77.

The signals from the audio photocell 75 are pulse signals with each pulse beginning at a time position indicative of the instantaneous magnitude of the original audio signals. The successive line scans are initiated in the opaque parts of the successive lines 52 so that the reproduced pulses are first initiated at the beginning of the light or transparent part of the lines 52 following the opaque parts. The pulses from the generator 73 are utilized for recovering the audio signals from the film strip 18. The flying spot scanner 82 scans the portion of the film strip 18 which includes the audio recorded lines 52 by means of a lens system 80 and a prism 79. The output of the photocell 75 is, accordingly, a series of pulses initiated at the light portions of the successive audio lines 52. The signals from the photocell 75 are provided to an amplifier and differentiating circuit 92 which provides a series of positive pulses for resetting a flip-flop circuit 90. The flip-flop circuit 90 is set by a delay circuit 88 controlled by the pulse generator 73. The flip-flop circuit 90 is, accordingly, set periodically at a substantially fixed time epoch but is reset at a time position varying in accordance with the audio information reproduced from the film strip 18. The flip-flop circuit 90, accordingly, produces varying duration pulses in accordance with the audio input signals.

The varying duration pulses from the flip-flop circuit 90 are provided to an integrator circuit 93 which develops a smooth varying signal which is essentially similar to the input audio signal. The signal from the integrator circuit 93 is amplified by an amplifier 94 and the amplified signal is provided to an audio output circuit 96. At the same time that the audio signals are received at the circuit 96, the video signals are received at an output circuit 78. The circuit 78 may include demodulating means for recovering the video signals from the frequency modulated carrier.

The reproduction system is effective as a noise suppressing system with respect to noise from any dirt or dust on the film strip 18. As described above, the scanner 82 initiates its trace or line scan after the beginning of a line 52 on the strip 18 which is upon an opaque portion of the strip 18. The flip-flop circuit 90 is reset at a time position when the scanner 82 reaches the transparent portion of the strip 18 at the end of the respective line 52. The flip-flop circuit 90 then remains reset and any dirt on the transparent portion does not set it or affect the time it is reset. Similarly, any dust or dirt on a line 52 does not cause the circuit 90 to reset and, accordingly, does not affect the reproducing accuracy or introduce a noise component.

Although this invention has been disclosed and illustrated with reference to particular applications, the principles involved are susceptible of numerous other applications which will be apparent to persons skilled in the art.

The invention is, therefore, to be limited only as indicated by the scope of the appended claims.

What is claimed is:

1. A recording system for line scan video signals wherein a plurality of line scans are arranged in successive frames each representing an image, including, means for frequency modulating the line-scan video signals, means coupled to the modulating means for rectangularizing the frequency modulated signals from said modulating means to provide a series of pulses varying in duration in accordance with the line-scan signals, a moving recording medium, means for moving said medium at a constant speed, line scanning means positioned relative to the moving recording medium and coupled to said rectangularizing means for recording the series of pulses in a succession of transverse tracks one for each line on the moving recording medium so that images of the successive frames are recorded on the medium.

2. A recording system in accordance with claim 1, wherein the recording medium is a film strip, and the line scanning means is a cathode ray tube for illuminating the film strip in accordance with the line scan video signals.

3. A recording system for line scan video signals wherein a plurality of line scans are arranged in successive frames, each representing an image, including means for frequency modulating the line-scan video signals, means coupled to the modulating means for rectangularizing the frequency modulated signals from said modulating means to provide a series of pulses varying in duration in accordance with the line-scan signals, a moving film strip, means for moving said film strip at a constant speed, line scanning means positioned relative to the moving film strip and coupled to said rectangularizing means for recording the series of pulses in a succession of transverse tracks one for each line on the moving film strip so that images of the successive frames are recorded on the medium, and means for providing a visible representation of the images represented in the successive frames of the line scan video signals, said providing means including a source of light for illuminating the recorded tracks on the film strip, said source being positioned to provide light along planes including the transverse tracks.

4. A recording and reproducing system for a continuous signal, a moving recording medium, means for successively sampling the continuous signal to provide a series of pulses having durations related to the instantaneous values of said continuous signal, means coupled to said sampling means and positioned relative to the moving recording medium for recording the series of pulses as a series of transverse tracks across the moving recording medium, each track having a length related to the duration of the respective pulse, line scanning means positioned relative to the moving recording medium for transversely scanning the moving recording medium with each line scan initiating after the beginning of the tracks on the recording medium, a bistable device having a first and a second operating condition, means synchronized with the bistable device for setting the device to its first condition at the initiation of each line scan by said line scanning means, and means coupled to said line scanning means for setting the device to its second condition at the end of each recorded track whereby the device is set at its first condition for an interval related to the duration of the pulse recorded in the respective track.

5. A recording and reproducing system for a continuous signal, a moving recording medium, means for successively sampling the continuous signal to provide a series of pulses having durations related to the instantaneous values of said continuous signal, means coupled to said sampling means and positioned relative to the moving recording medium for recording the series of pulses as a series of transverse tracks across the moving recording medium, each track having a length related to the duration of the respective pulse, line scanning means positioned relative to the moving recording medium for transversely scanning the moving recording medium with each line scan initiating after the beginning of the tracks on the recording medium, a bistable device having a first and a second operating condition, means synchronized with the bistable device for setting the device to its first condition at the initiation of each line scan by said line scanning means, means coupled to said line scanning means for setting the device to its second condition at the end of each recorded track whereby the device is set at its first condition for an interval related to the duration of the pulse recorded in the respective track, and means coupled to said device and responsive to its operation for providing a continuous signal substantially the same as the input signal sampled by said sampling means.

6. A recording and reproducing system for a continuous signal, a continuously moving light sensitized surface, means for successively sampling the continuous signal to provide a series of pulses having durations related to the instantaneous values of said continuous signal, means coupled to said sampling means and positioned relative to the moving light sensitized surface for recording the series of pulses from said sampling means as a series of opaque transverse tracks across the moving surface, each track having a length related to the duration of the respective pulse, line scanning means positioned relative to the moving surface for transversely scanning the moving surface with each line scan initiating after the beginning of the tracks on the moving surface, a bistable device having a first and a second operating condition, means synchronized with the bistable device for setting the device to its first condition at the initiation of each line scan by said line scanning means, and means coupled to said line scanning means for setting the device to its second condition at the end of each recorded track whereby the device is set at its first condition for an interval related to the duration of the pulse recorded in the respective track.

7. A recording system for line scan video signals wherein a plurality of line scans are arranged in successive frames, each representing an image, including means for frequency modulating the line-scan video signals in a direction to provide lower frequencies for the lighter portions of the images and higher frequencies for the darker portions of the images, and means optically coupled to the film strip for providing visible images substantially similar to the visible images represented in the successive frames of the line-scan video signals.

8. In combination, a film strip having recorded thereon successive lines of frequency modulated video signals representing successive images where the modulation is in a direction of higher frequencies for darker portions of the images, and optical means optically coupled to the film strip for illuminating in each image at each instant all of the recorded lines of frequency modulated signals in a direction such that the light is provided to the film strip along planes including the recorded lines to produce optical interference patterns in the signals in the recorded lines for a blending of different positions with different intensities in accordance with the frequencies of the signals at such positions.

9. A method of providing a visible image of the video information carried by line scan video signals, including the steps of frequency modulating the video signals on a carrier in a direction to provide lower frequencies for the video signals representing lighter portions of the video information and higher frequencies for the video signals representing darker portions of the video information, rectangularizing the frequency modulated carrier, recording the rectangularized carrier on a film strip as successive transverse lines made up of light and dark dots of varying lengths, and then illuminating the recorded lines on the film strip in a direction such that the light is provided to the film strip along planes including the recorded transverse lines.

10. A method of providing a visible image of the video information carried by line scan video signals, including the steps of frequency modulating the video signals on a carrier in a direction to provide lower frequencies for the video signals representing lighter portions of the video information and higher frequencies for the video signals representing darker portions of the video information, rectangularizing the frequency modulated carrier, recording the rectangularized carrier on a film strip as successive transverse lines made up of light and dark dots of varying lengths, then illuminating the recorded lines on the film strip in a direction such that the light is provided to the film strip along planes including the recorded transverse lines, and then viewing the illuminated film strip along a path perpendicular to the illuminated surface of the film strip.

References Cited by the Examiner

UNITED STATES PATENTS 2,681,382 6/1954 Hilburn ------------ 178—6.7

DAVID G. REDINBAUGH, *Primary Examiner.*